US005082521A

United States Patent [19]

Sayyadi

[11] Patent Number: 5,082,521

[45] Date of Patent: Jan. 21, 1992

[54] SEQUENCING MACHINE AND METHOD

[75] Inventor: Babak Sayyadi, Seattle, Wash.

[73] Assignee: The Boeing Company, Seattle, Wash.

[21] Appl. No.: 628,246

[22] Filed: Dec. 17, 1990

[51] Int. Cl.[5] .......... B32B 31/10

[52] U.S. Cl. .......... 156/552; 156/55; 156/475; 156/579; 29/755; 29/868; 53/399; 174/72 A

[58] Field of Search .......... 156/552, 176, 178, 579, 156/296, 55, 475, 468; 174/72 A, 72 TR, 117 A; 40/316; 29/868, 755; 53/553, 554, 559, 397, 399, 450, 451

[56] References Cited

U.S. PATENT DOCUMENTS

| | | | |
|---|---|---|---|
| 418,519 | 12/1889 | Johns | 156/176 |
| 1,481,866 | 1/1924 | Heist | 156/552 |
| 1,970,047 | 8/1934 | Lück | 53/553 |
| 2,418,054 | 3/1947 | Sloan et al. | 53/399 |
| 2,586,580 | 2/1952 | Truscott | 53/553 |
| 3,421,284 | 1/1969 | Zemek | 156/552 |
| 3,669,309 | 6/1972 | Romeo | 156/552 |
| 3,686,820 | 8/1972 | Zenger et al. | 53/559 |
| 3,733,428 | 5/1973 | Fry | 156/178 |
| 3,736,198 | 5/1973 | Leistner | 156/296 |
| 3,821,058 | 6/1974 | Miller | 156/579 |
| 3,878,663 | 4/1975 | Shelton | 53/399 |
| 4,154,977 | 5/1979 | Verma | 29/423 |
| 4,279,278 | 7/1981 | Weresch | 156/552 |
| 4,415,765 | 11/1983 | Iwasa et al. | 40/316 |
| 4,424,627 | 1/1984 | Tarbox | 174/72 A |
| 4,642,159 | 2/1987 | Weresch | 156/552 |

*Primary Examiner*—Michael W. Ball
*Assistant Examiner*—Daniel J. Stemmer

[57] ABSTRACT

A sequencing machine and method for retaining the order in which wires are placed. The sequencing machine will preserve the order of inserted wires by capturing each individual wire in a belt of tape. At a later stage the wires can then be taken out in the same exact reverse or forward order. The adhesive bond between the tapes is such that separation can be performed by hand without damage to the tape material.

2 Claims, 3 Drawing Sheets

SEQUENCING MACHINE AND METHOD

BACKGROUND OF THE INVNETION

The prior art patent literature includes U.S. Pat. No. 4,360,400 to Davis et al which shows placing of wires between two self-adhesive tapes for separation. However, this machine tapes the wire bundles.

U.S. Pat. No. 4,415,765 to Iwasa et al and U.S. Pat. No. 4,154,977 to Verma are illustrative of taping and shelving individual wires of a bundle. However, descriptive of tooling equipment utilized to accomplish taping.

The present sequencing machine eliminates the need for reidentification by preservation of the original order. The connector assembly station can, e.g. treat the wires sequentially based on its data base containing the original routing order.

Prior to installation, wire bundles are formed to their exact shape and size. A bundle is made by laying individual wires per engineering specifications and routing to a predetermined location on a form board using the specified path.

Each individual wire is identified prior to routing. Once all the wires have been routed, the bundle can then be transferred to a stripping station, connector insertion station, or other data driven stations. For example at an automated connector assembly station each individual wire in a formed bundle must be reidentified by reading individual wire (identification) I.D. number to determine their insertion location.

DETAILED DESCRIPTION OF THE DRAWINGS

Figure 1:
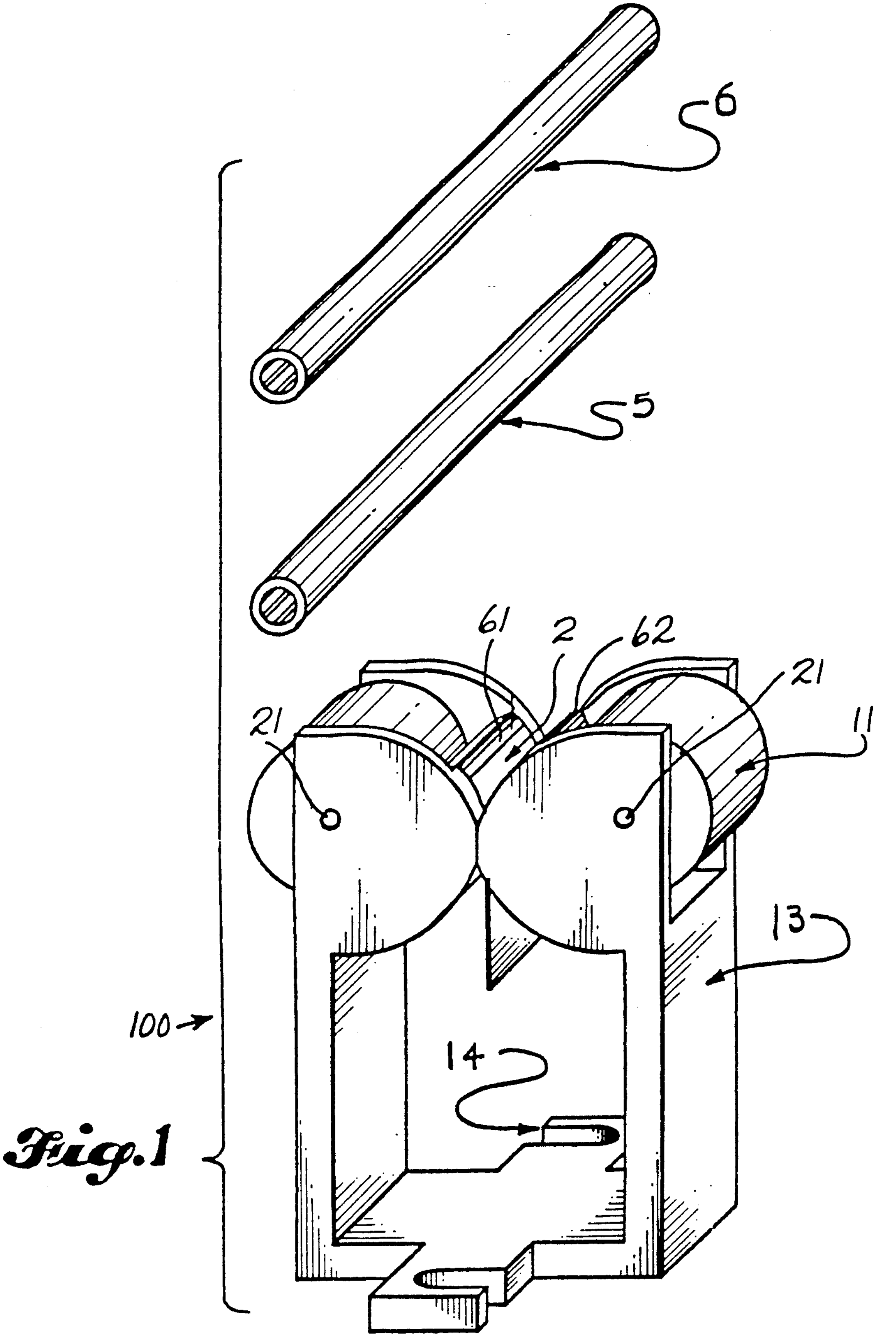
FIG. 1 is a perspective view of the sequencing machine embodying the present invneton.
Figure 2:
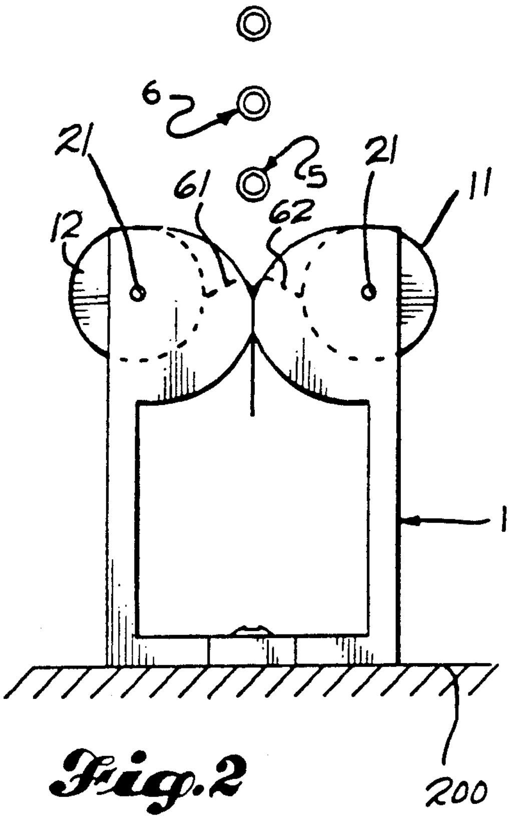
FIGS. 2-6 are frontal views of the sequencing machine showing progression of a wire through the upper arm portions of the machine.

The present sequencing machine 100 consists of three subassemblies (See FIG. 1), a clamp 13, and two rolls of back adhesive tape 11 and 12. The clamp 13 is mounted on a form board 200 (See e.g. FIGS. 2-6) by a twisting action using the two side slots 14. The slots allow the sequencing machine to be easily removable.

The rolls of tape 11 and 12, are inserted in the clamp 13 one on each side or upper arm portion of U-shaped clamp 13, and snapped in place over the plastic protrusions 21. Each upper arm portion of U-shaped clamp 13 has an arcuate pressing surface 2 as seen in FIG. 1 and over which rolls of tape 11 and 12 pass. The arcuate pressing surfaces 2 are biased toward one another by the arms which allow the surface to move apart so that the wires 5 and 6 can be inserted therein. The two tape roll's adhesive sides 61 and 62 are attached together and pushed down through the clamp causing the adhesive parts to be faced up prior to insertion of wire into the clamp 13. Sequencing machine 100 is now prepared to be used.

Figure 3:
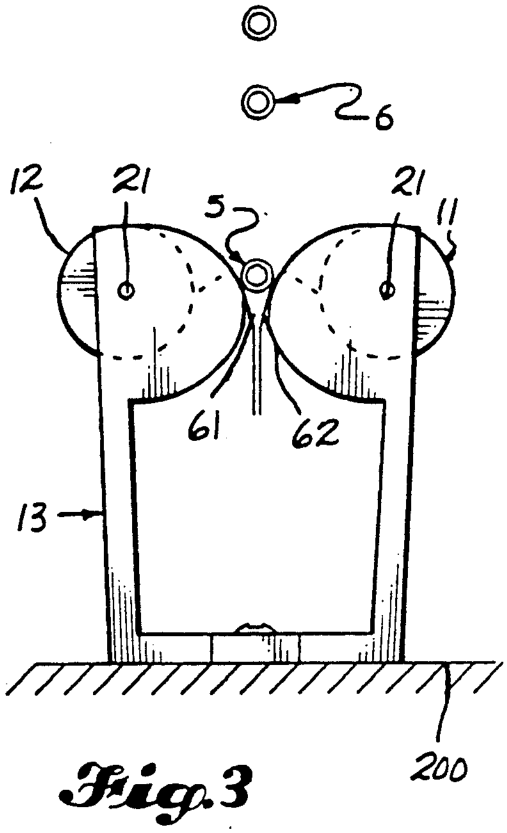

As the first wire 5, is inserted through clamp 13 the adhesive side, 61 and 62 of corresponding tapes 11 and 12 attach to wire 5 (See FIG. 3).

Figure 4:
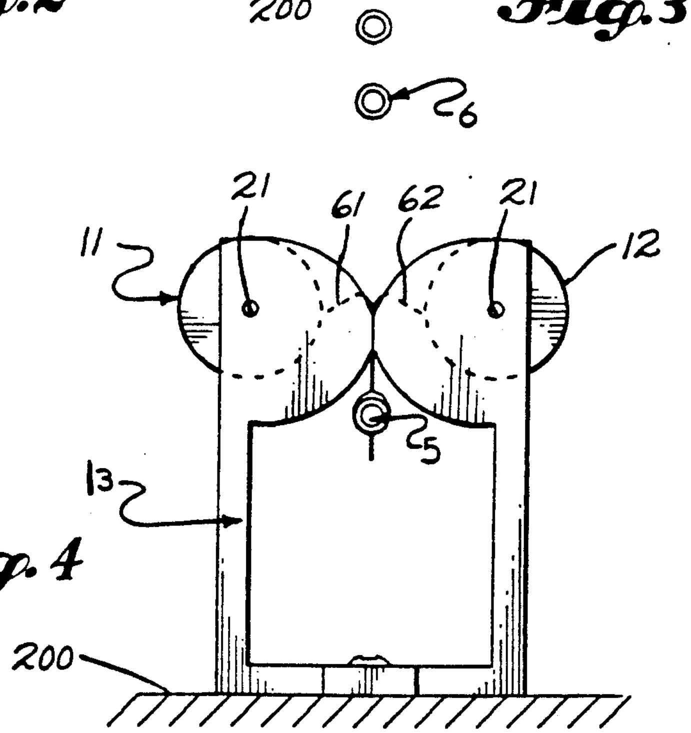

As the wire is pressed down further, the tapes follow it and eventually after passing through the clamp 13, wire 5 is captured by the inner adhesive sides 61 and 62 of tapes 11 and 12 (See FIG. 4)

Figure 5:
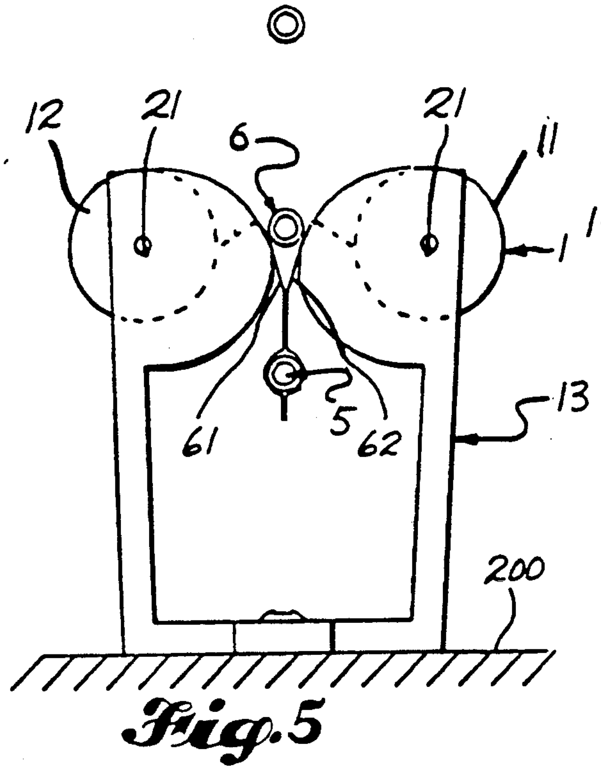
Figure 6:
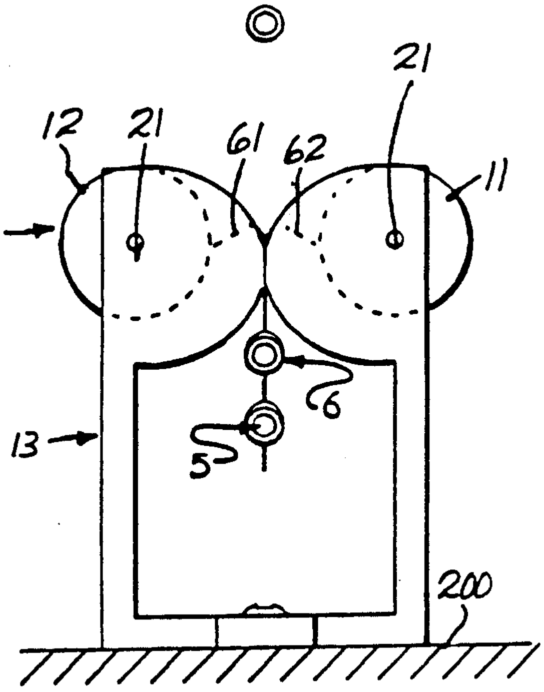
Figure 7:
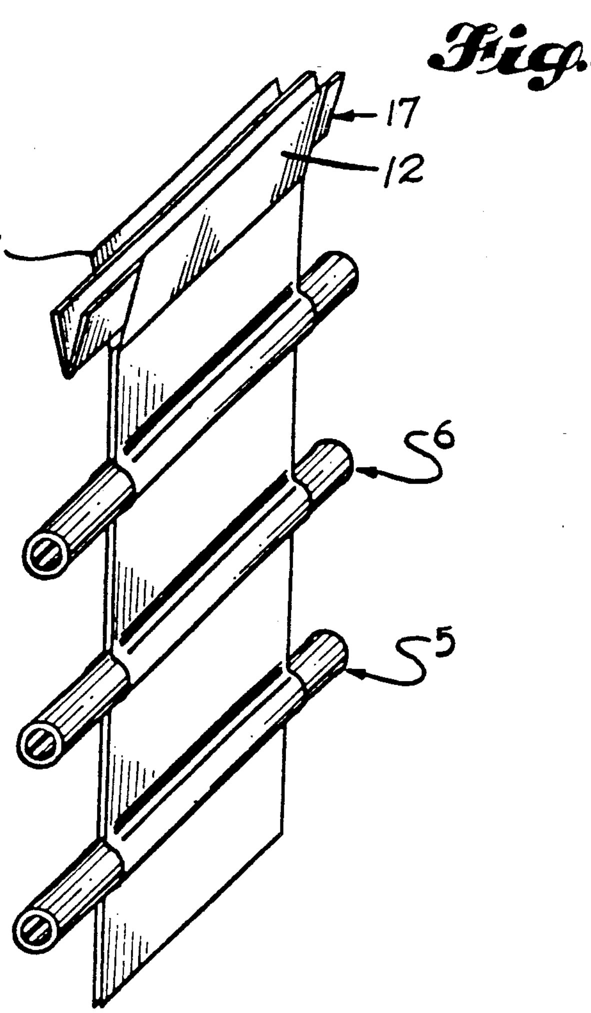
FIG. 7 is a perspective view of a sequenced bundle formed using the squencing machine of the present invention.

The second wire 6, follows the same steps and it is eventually captured by the inner adhesive sides 61 and 62 tapes 11 and 12 once it passes through clamp 13 in the same manner that first wire 5 was captured (See FIGS. 5 and 6).

After the last wire (not shown) has been routed, a perforated separating "V" shaped paper member 17, is inserted through clamp 13 to help in identifying the top end of the taped wires and utilized as a method for operating of tapes 11 and 12 at the next station. The sequenced end of the bundle is pulled back out of the clamp 13.

What is claimed is:

1. A sequencing machine for retaining the order in which wires are placed comprising in combination:

- a clamping means having a U-shaped member having a pair of upper arm portions;
- each of said upper arm portions having mounting means including center protrusions for supporting a roll of tape, each of sadi rolls of tape having facing adhesive backed surfaces for securing a sequence of wires passing therebetween;
- each upper arm portion also including an arcuate pressing surface over which said tape passes, each arcuate pressing surfaces being biased toward one another by said arms and said arms allowing said arcuate pressing surfaces to move apart to allow insertion of wires therebetween.

2. The sequencing machine according to claim 1 wherein said sequencing machine is removed from a form board (200) by twisting at sideslots.

* * * * *